Jan. 23, 1934. E. A. THOMPSON 1,944,331
SYNCHRONIZED TRANSMISSION MECHANISM
Filed July 30, 1932  2 Sheets-Sheet 1

Inventor
Earl A. Thompson
By Blackmore, Spencer & Flint
Attorneys

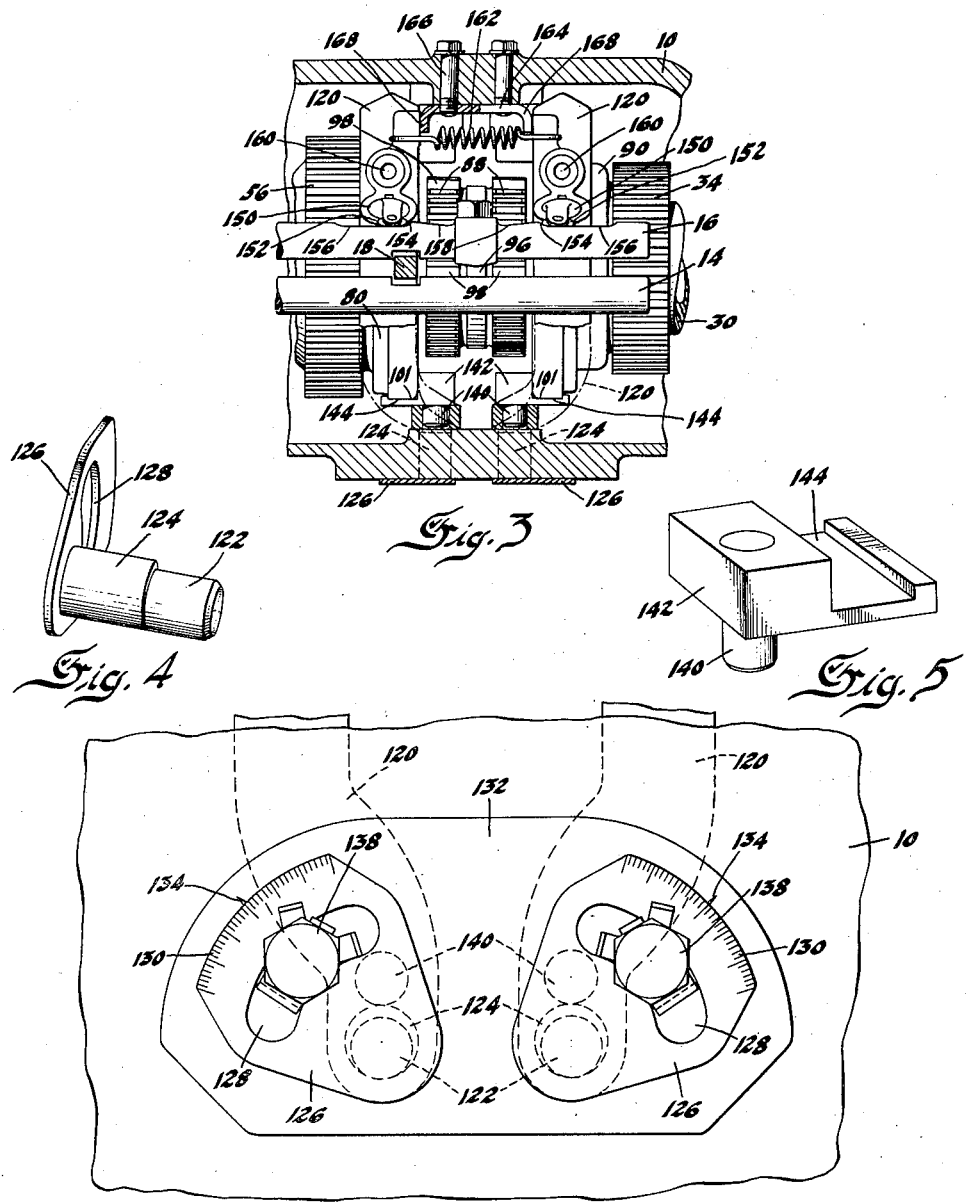

Patented Jan. 23, 1934

1,944,331

UNITED STATES PATENT OFFICE 1,944,331

SYNCHRONIZED TRANSMISSION MECHANISM

Earl A. Thompson, Birmingham, Mich., assignor to General Motors Corporation, Detroit, Mich., a corporation of Delaware Application July 30, 1932. Serial No. 626,325

3 Claims. (Cl. 192—53)

This invention pertains to improvements in variable speed gear trains, intended to transmit the power of an engine to the traction wheels of an automobile, of the general type disclosed in U. S. patent to E. A. Thompson, No. 1,854,231, granted April 19, 1932, and U. S. patent application filed by E. A. Thompson, April 25, 1927, S. N. 186,454. In this type of transmission the main driven or power output shaft is, by the operation of a conventional hand controlled lever, first coupled directly to the power input shaft by a friction coupling and when equal speeds of these shafts have been attained through the friction coupling the latter is released and the two shafts are coupled positively by interlocking the teeth of toothed clutch elements. Second speed gear on the power output shaft remains in constant mesh with the corresponding countershaft gear driven by said power input shaft; and when it is desired to select second speed train, second speed gear on the output shaft is likewise first coupled frictionally to the output shaft, then the friction coupling is released and the gear positively locked to the shaft.

In mechanism of the type referred to it is necessary to apply high pressure to the friction couplings in order to accomplish synchronization in the brief period of time within which the operator moves the usual control lever from its neutral position, in which all trains are disconnected, to the position that it occupies when the gears of the selected train are interconnected in power transmitting relation. In order to apply the high pressure necessary without the exertion of substantially more effort by the operator on the control lever than is required, for example, to shift one slidable gear into mesh with another, a friction clutch operating lever of high mechanical advantage is interposed between the manual control lever and the movable element of the friction clutch to be engaged. And in order that the quantity of force necessary to press the movable friction clutch element against its companion may be uniformly applied under uniform conditions and then the pressure on the friction clutch operating lever be released, the latter is detachably connected with one of the shifter slides, selectively operated by the control lever, by means of a lock bolt which causes the clutch operating lever to move with the shifter slide until a precalculated amount of resistance to further movement of said lever is opposed by firm contact of the friction clutch elements, whereupon the lock bolt is automatically released. As disclosed in the prior patent and application referred to, the end of the lock bolt is engaged by a keeper on the shifter slide, moving in a direction transverse of the axis of the lock bolt. The contacting surfaces of lock bolt and keeper are so contoured that the force of the shifter slide applied to the latter is resolvable into a force acting to rock the lever, and a force acting in a direction to release the lock bolt. The latter force is resisted by a carefully calibrated resisting means, such as a liquid containing dash pot, which opposes unlocking movement of the bolt in proportion to the speed of movement of the shifter slide, and thus automatically measures the time-force factor of the synchronizing effort.

The mechanism of application S. N. 186,454 has been in commercial production several years. In that application a single yoke lever is utilized for engaging the friction synchronizing clutches in both second and third speed gear trains and in order that one yoke lever may operate either pair of friction clutches at will it is necessary to provide two spring pressed locking plungers and metering dashpots. In this construction the oil in both dashpots is pressed back upon shifting either into second or third speeds, due to the tilting of the yoke lever. This causes considerable useless increase of resistance to movement of the manual control lever since, of course, compression on the dashpot back of the lock bolt not then operative performs no useful function, merely reducing the efficiency of the mechanism. By substituting two separate yoke levers for one, —one lever for each friction clutch, each equipped with a releasable lock bolt and metering dash pot, —only that dash pot which is on the yoke lever then operating exerts resistance during a shifting operation.

Furthermore, as the movable friction clutch elements have a very small amplitude of movement between the fully engaged and disengaged positions and demand an extreme manufacturing nicety in locating the axially fixed and axially movable friction elements with respect to each other and to the single operating lever shown in said application #186,454, its fulcrum and points of application of power and resistance, and in machining of the coacting elements, the manufacturing tolerances necessary are so small as to slow up the manufacturing processes if exact fitting and correct coordination of the parts is to be achieved.

It is an object of this invention to facilitate manufacture, avoid imperfections and maladjustments of the synchronizing elements, by using two yoke levers, one for each movable friction clutch element, respectively engaging the axially fixed friction surfaces on second speed gear and on power input shaft, so that, instead of having it fit one lever to operate two clutches and coordinating that lever with separate movable clutch elements so as to actuate said separate clutch elements with nicety during the movement of the lever in opposite directions, separate levers are used, thereby necessitating the coordination of each lever with but one clutch. Furthermore, adjustable fulcrum pins are supplied for each lever, by the use of which manufacturing tolerances may be increased since nicety of fit and accuracy of movement may be achieved, after completion of manufacture, by adjusting the fulcrum pins.

In the accompanying drawings, in which like reference characters indicate like parts throughout the several views:

Fig. 3 is a section on line 3—3 of Fig. 2;

Fig. 4 is a perspective view of one of the adjustable fulcrum pins of a friction clutch operating lever;

Fig. 5 is a perspective view of one of the shoes through which a clutch operating lever applies pressure to the movable element of a frition clutch;

Fig. 6 shows the arrangement in the gear casing of two adjustable fulcrum pins and friction clutch operating levers with means for adjusting the pins.

Figure 1:
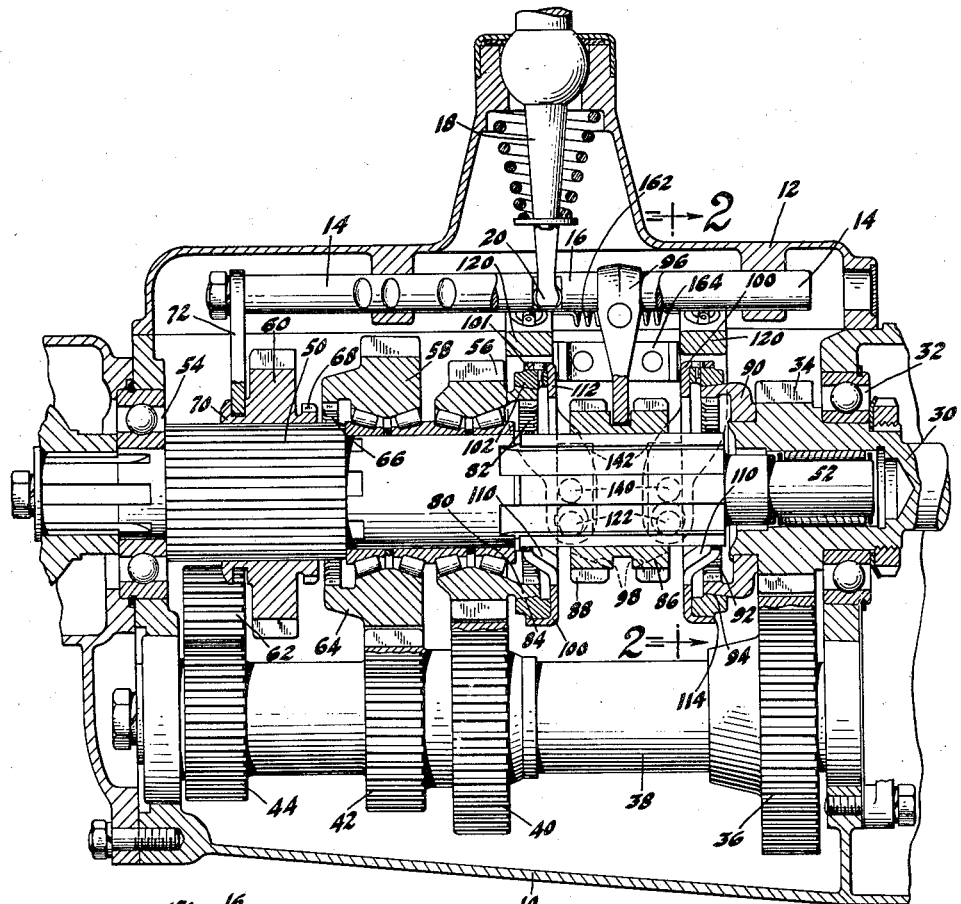
Fig. 1 is a longitudinal vertical section through the gear box of an automobile variable speed gear transmission mechanism embodying the invention.

In the drawings the main body of a gear box or shaft and gear supporting casing is indicated by 10. This body has an open top closed by a detachable cover 12 which supports slidable shifter rails 14 and 16, and the hand control lever 18, the lower end 20 of which is adapted to be selectively engaged with rail 14 to couple first or low speed and reverse trains and with rail 16 to couple second or intermediate and third or high speed trains, in a manner and by means to be described.

The rearward end of power input shaft 30, which is the usual main clutch shaft of an automobile transmission mechanism, is supported in bearing 32 in the forward wall of casing 10. Gear 34 is rigid with the power input shaft within the casing and meshes constantly with gear 36 rigid with countershaft 38. Also rigid with countershaft 38 are gear 40 of the second speed train, gear 42 of the first speed train, and gear 44 of the reverse train. The ends of the countershaft are suitably journaled and supported by the front and rear walls of casing 10.

Main driven or power output shaft 50 has a reduced forward end 52 piloted, in accordance with usual practice, within a bore in the rearward end of input shaft 30. Shaft 50 is journaled in an anti-friction bearing 54 in the rear wall of the casing 10 and is designed to transmit power as usual to a propeller shaft which drives the rear traction wheels of an automobile.

Gear 56 of second speed train is centered on roller bearings on shaft 50 and remains always in mesh with counter shaft gear 40. Gear 58 of first speed train is similarly mounted on shaft 50 and remains always in mesh with counter shaft gear 42. Gear 60 is keyed slidably to shaft 50 and may be slid rearward into mesh with reverse idler gear 62, which is always in mesh with counter shaft gear 44 of the reverse train. First speed gear 58 is provided with a ring-like rearward projection 64 equipped with internal clutch teeth 66 adapted to be interlocked with external clutch teeth 68 on a forwardly projecting annulus rigid with slidable gear 60. From the rear face of gear 60 projects a grooved hub 70 engaged by shifter fork 72, secured to shifter rail 14. When, therefore, rail 14 is shifted rearward gear 60 is caused to mesh with reverse idler gear 62, and when said rail is shifted forward gear 58 becomes clutched to gear 60 and is thus locked to shaft 50 so that first speed train is operative.

Gear 56 of second speed train is provided with a ring-like forward projection 80 equipped with an annular row of internal clutch teeth 82 and an outer conical friction clutch surface 84. In order to lock gear 56 to shaft 50 a double ended clutch element 86 is slidably keyed to shaft 50 and provided on each end with angularly separated groups of external clutch teeth 88 the rearward teeth being adapted to interlock with the clutch teeth 82 of gear 56 when said member 86 is moved rearward,—to the left, as shown in Fig. 1.

Rigidly secured to or integral with the rearward end of power input shaft 30 is the cup shaped member 90 formed internally with an annular row of clutch teeth 92 and externally with a conical friction clutch surface 94. If slidable clutch element 86 be moved forward the forward groups of teeth 88 thereon will interlock with said internal clutch teeth 92 and secure the power output shaft 50 to the power input shaft 30.

The double ended slidable coupling, or positive clutch element 86, is formed between the two groups of teeth thereon with a circumferential groove engaged by a shifter fork 96 which is secured to shifter rail 16. When shifter rail 16 is moved rearward by the shift lever 18, coupling 86 is interlocked with gear 56 to render second speed train operative and when said rail is moved forward coupling 86 is interlocked with member 90 rigid with shaft 30 to render third speed train operative, shafts 30 and 50 being then directly coupled for transmitting high speed.

Prior to positively coupling second speed gear 56 to power output shaft 50, said gear is frictionally coupled to the shaft in order to bring the gear and shaft to approximately the same angular speed before attempting to interlock the teeth of the positive coupling elements. Likewise prior to directly coupling positively power input shaft 30 with power output shaft 50 these shafts are first frictionally coupled. The means for frictionally coupling gear 56 to shaft 50 comprises the ring-like projection 80 on gear 56 with the external conical surface thereon, constituting one element of a friction cone clutch, and the cooperating axially movable friction element 100 surrounding shaft 50 and provided with a circumferential flange 101 and an internally coned friction surface, preferably formed on a bronze inset ring 102, constituting the other element of said friction clutch. Friction element 100 is provided with openings 104 to permit the passage therethrough of the rearward groups of teeth 88 on slidable toothed coupling element 86, and is prevented from rotating with respect to shaft 50 by lugs 106 disposed in the grooves between the lands or splines 108 on driven shaft 50. Each group of teeth on coupling element 86 is separated from adjacent groups by a groove 98 having an inclined bottom surface. Spoke-like arms or formations 110 separate the openings 104 of the friction element 100 one from another. These spoke-like arms curve or dish inward from the outer zone 112 substantially to the plane of the edge 114 of flange 101 so that the lugs 106 engage in the grooves of shaft 50 in such position that the friction clutch element 100 does not obstruct engagement of teeth 88 of toothed coupling member 86 with the clutch teeth 82 on gear 56, the grooves 98 of member 86 receiving the spoke-like arms that separate the openings 104 of the element 100.

The friction clutch elements for frictionally coupling shaft 30 and shaft 50 to procure high or third speed ratio are substantially identical with those for frictionally coupling gear 56 to shaft 50 and need not be further described.

In order to first cause the friction clutch elements to engage under sufficient pressure to effect synchronous rotation of the positive coupling elements and also to release the friction clutch elements prior to interlocking of the positive coupling elements, synchronizing or friction clutch operating levers having a high mechanical advantage are fulcrumed on the casing and have their work arms coupled to the movable elements of the friction clutches, and their power arms releasably locked to the shifter rail in such manner that when a predetermined quantity of pressure has been applied to either movable friction clutch element thru the hand control lever, rail and synchronizing lever, the latter becomes detached from the shift rail and is restored by springs or the like to initial position. Thereupon continued movement of the rail effects engagement of the positive clutch elements.

The synchronizing levers connected to the second speed synchronizing clutch and to the third or high speed synchronizing clutch are levers of the second order substantially identical in structure although they operate in opposite senses.

Figure 2:
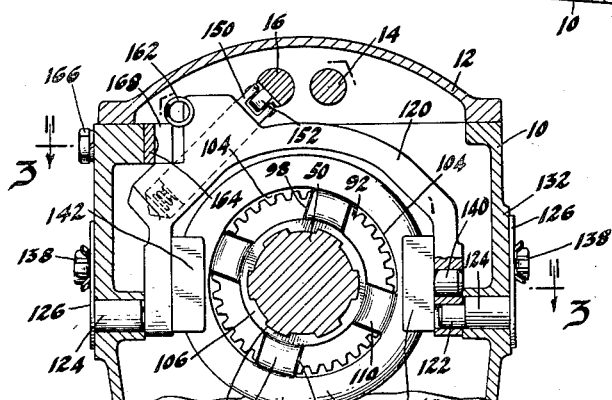
Fig. 2 is a transverse section on line 2—2 of Fig. 1.

Each synchronizing lever 120 is bifurcated or yoke-like in form as illustrated in Fig. 2. Each limb of each lever 120 is pivoted on an adjustable fulcrum pin 122 formed eccentric to the center of the cylindrical body 124 rotatably mounted in the side wall of casing 10 there provided with a boss 126 to afford a long bearing. The bodies 124 of the fulcrum pins for both arms of one lever are in axial alinement in opposite side walls of the casing, as shown in Fig. 2. Each body 124 is rigid with an adjusting plate or arm 126 having an arcuate slot 128 curved about the axis of body 124 and a dial or plurality of graduations 130 on one edge which is also curved in an arc about the axis of body 124. When the adjustable fulcrums are in position plates 126 lie snugly against plane external surfaces 132 on the side walls of the casing that are provided with suitable reference marks 134 by which, in cooperation with the dial, the adjustment position of pins 122 may be ascertained. Headed bolts 138 pass thru slots 128 and are threaded into the casing in order to clamp plates 126 in any selected adjustment.

The points of application of levers 120 to the resistance to be overcome are the axes of pins 140 by which clutch operating shoes 142 are connected, one to each limb of lever 120. Shoes 142 are formed with grooves 144 adapted to fit over the cylindrical flanges 101 of movable friction elements 100 as illustrated in Fig. 3. As shown in Fig. 2 shoes 142 on the two limbs of lever 120 are diametrically opposite so that pressure is applied by them to clutch element 100 symmetrically on opposite sides of the clutch axis.

The power arm of each lever 120 terminates in a releasable locking plunger or bolt 150 the outer extremity of which is equipped preferably with a roller 152 adapted to be engaged by one or the other of two shoulders 154, functioning as lock bolt keepers, on shift rail 16, as shown in Fig. 3, when the rail is shifted in a direction to effect coupling of either second or third speed trains. Shoulders 154 are shown formed on the shift rail by cutting depressions 156 in the rail. Between the shoulders and the connection of shifter fork 96 to rail 16 are formed inclined surfaces 158 as disclosed in said Patent 1,854,281 for a similar purpose. Plunger 150 is urged toward rail 16 by the pressure of springs and its retraction is resisted in proportion to the speed of movement of the shift rod when a shoulder 154 is being pressed against the roller 152 of one of the plungers, as in said Patent #1,854,281, by a dash pot kept constantly supplied with oil received from the splash of lubricating oil in the casing, due to the rotation of the gearing, thru the orifice 160.

A spring 162, attached to the power arm of each yoke lever 120 tends to hold each in initial position. Stops for limiting the approaching movement of the levers may consist conveniently of a U-shaped bracket 164 bolted to the under side of the left wall of the casing by bolts 166, the limbs 168 serving as stop members. After synchronizing pressure has been applied to one of the friction clutches and released to permit engagement of the positive coupling members the synchronizing lever that has operated will be returned to initial position, it will be apparent, after the shoulder 154 has passed over the plunger roller 152, both by the pull of spring 162 and the elastic pressure of plunger 150 and roller 152 on the incline 158 on the shift rail 16.

As the work arms of levers 120 are much shorter than the power arms, and the engaging friction clutch faces are coacting cones the angles of which have been selected to afford the most efficient frictional engagement consistent with releasability when the work of synchronization has been completed, it will be apparent that the fluid friction internal brake behind the plunger 150, may be so adjusted as to cause the required amount of force to be exerted on the movable element 100 of the friction clutch, necessary to effect synchronization (which is very much larger than that applied to slidable positive coupling element 86), without requiring a substantial increase of effort on the part of the operator over that which is required to shift coupling element 86.

After the elements of the transmission mechanism have been manufactured and assembled in the gear box the mechanism is tested to ascertain whether the synchronizing mechanism operates properly. In case it is discovered that the movable friction clutch elements or either of them do not seize properly, or have too much or too little clearance with respect to the axially fixed friction surfaces of the mating elements, correction is applied by adjusting the fulcrum of pins of each lever separately until the correct location of the point of application of pressure from the lever to the movable clutch element is found. Then each fulcrum pin is firmly secured by tightening the bolts 138. The ends of the power arms of the yoke levers are located by the fixed stops 168. Adjustment of the fulcrum pins, therefore, does not affect the relation between the plungers 150 and the shoulders 154 on the shift rail 16 but will relocate the limits of the range of motion of the work points of the levers, that is, the axes of pins 140 which connect clutch operating shoes 142 to said levers.

I claim:

1. In mechanism of the class described, the combination of supporting means, rotary coaxial members adapted to be coupled or uncoupled, a friction and a positive clutch element fixed to one member, axially movable independent friction and positive clutch elements in driving connection with the other member, means for axially moving said last-named elements into and out of engagement with their companions, said means comprising a shift rail, a shifter fork for moving the axially movable positive clutch element, a lever, an adjustable fulcrum for said lever on said supporting means, means for operatively connecting said lever to the movable friction clutch element, and a releasable lock plunger coacting between the power arm of the lever and the shift rail.

2. A combination as defined in claim 1 in which the supporting means is a casing encasing the mechanism and in which the adjustable fulcrum comprises an eccentric pin mounted in the casing and provided exteriorly of the casing with means whereby the pin may be angularly adjusted and fixed in adjusted position.

3. A combination as defined in claim 1 in which the supporting means is a casing encasing the mechanism, said lever comprising two limbs pivoted respectively on independently adjustable fulcrum pins mounted respectively in opposite side walls of the casing.

EARL A. THOMPSON.